US005521771A

United States Patent [19]

Keithley et al.

[11] Patent Number: 5,521,771

[45] Date of Patent: May 28, 1996

[54] SERVO GAIN COMPENSATION IN A DISK DRIVE

[75] Inventors: Douglas G. Keithley; Harold C. Ockerse, both of Boise, Id.

[73] Assignee: Hewlett-Packard Company, Palo Alto, Calif.

[21] Appl. No.: 755,934

[22] Filed: Sep. 6, 1991

[51] Int. Cl.$^6$ .......... G11B 21/02; G11B 5/596

[52] U.S. Cl. .......... 360/75; 360/77.04; 360/77.05

[58] Field of Search .......... 360/67, 77.05, 360/78.14, 77.04

[56] References Cited

U.S. PATENT DOCUMENTS

| | | | |
|---|---|---|---|
| 4,688,118 | 8/1987 | Knowles et al. | 360/77.05 |
| 4,786,990 | 11/1988 | Overton et al. | 360/67 |
| 4,823,212 | 4/1989 | Knowles et al. | 360/78.14 |
| 5,041,926 | 8/1991 | Ockerse et al. | 360/77.05 |

*Primary Examiner*—David C. Nelms
*Assistant Examiner*—Trong Phan
*Attorney, Agent, or Firm*—E. F. Oberheim

[57] ABSTRACT

In a disk drive, servo gain correction, in the presence of servo code signal variations, is achieved by utilizing the servo position signals to produce a servo gain scaling signal which is combined with the servo position signals to produce a corrected servo position signal for controlling the servo. The disk tracks comprise four phases of servo code, either dedicated or sampled servo code. The servo code is conventionally defined by four phases of recorded magnetic dibits, A, B, C, D. Normal, N, [N=(A−B)] and quadrature, Q, [Q=(C−D)], servo position signals are developed from the recorded dibits, either or both of the normal and quadrature signals may be used for controlling the servo. Absolute value signals |N| and |Q| are rectified values of the normal N, and quadrature, Q, signals. The absolute value signals are summed to produce a scaling signal, |N|+|Q|, and the respective servo signals N and Q are scaled by multiplication with an inverse function $$\frac{1}{|N|+|Q|}$$

of the scaling signal, |N|+|Q|, called the servo gain scaling signal, to produce a corrected servo position signal, N*, or, Q*, respectively defined as $$N^*=\frac{N}{|N|+|Q|}\ ;\ Q^*=\frac{Q}{|N|+|Q|}\ ,$$

either of which, or the joint use of which, may be employed for controlling the servo system.

16 Claims, 11 Drawing Sheets

SERVO GAIN COMPENSATION IN A DISK DRIVE

BACKGROUND OF THE INVENTION

1. Field of the Invention

This invention relates generally to servo systems for positioning transducers, such as magnetic heads, in disk drives and more particularly to such servo systems in which provision is made for correcting variations in transducer outputs for eliminating variations in servo gain.

2. Description of the Prior Art

In disk drives, variations in recorded servo code, variations in the dimensions of magnetic poles on magnetic heads, and variations in electromagnetic properties among the magnetic heads cause variations in the induced signals which result in variations in servo gain. This adversely affects servo performance in track seeking and track following functions.

In these disk drives, the magnetic heads are mounted on flexure assemblies. Each flexure assembly comprises a load beam and a thin flexure on the end of the load beam which mounts the magnetic head and which functions as a gimbal permitting pitch and roll of the magnetic head while providing directional stiffness therefor. Each surface of each disk of the disk drive is scanned by a magnetic head. Thus, depending upon the number of disks, two or more such flexure assemblies comprise part of an arm stack of an actuator, either of the linear or rotary type, for moving the magnetic heads to different tracks for reading or writing purposes.

The arm stack is powered by a motor, for example, a voice coil type of motor which is part of a servo. The servo is controlled by a microprocessor which converts requests for information from a host computer into disk, head, track and track sector selections, providing voice coil power and response to head feed back in track seeking, track following and read/write functions.

Disk drives are precision mechanical devices, providing track seeking and track following functions in track densities of typically 2,000 tracks per inch and higher. In such a mechanical environment, position transducer signal precision, particularly in regard to signal gain, is also required, to minimize servo gain variations.

Although the fabrication of the magnetic heads and the recording of servo code on the disks are accomplished with high precision. There is sufficient variation in the physical dimensions and the electromagnetic properties among individual heads to result in undesirable signal variations among the heads in demodulating the servo position signal. Likewise, the same magnetic head in scanning different tracks of servo code may show undesirable-signal gain variations.

Examples of different approaches presently known to the applicants, which have been taken in the past in achieving compensation for variations in servo code are described in U.S. Pat. Nos. 4,688,118, 4,786,990, and 4,823,212, which are discussed below. All of these patents are assigned to the assignee of this invention.

U.S. Pat. No. 4,688,118 provides compensation for signal gain by employing individual magnetic heads to record special servo code patterns and thereafter to read the servo code patterns which it has recorded. Thus, magnetic heads which may have different widths and different electromagnetic properties "see" the same amount of servo code and experience the same electromagnetic coupling to minimize servo gain.

U.S. Pat. No. 4,786,990 achieves servo gain variation compensation among the heads of a disk drive by detecting individual servo gain corrections which are required for each magnetic head at several different tracks on each disk surface. These corrections are stored and are accessed each time a particular head is selected to provide servo gain variation compensation at a particular track location for that magnetic head.

U.S. Pat. No. 4,823,212 provides an AGC field ahead of the embedded servo code in each track on each disk surface, so that during track seeking and in advance of track following the servo gain reading for that head can be determined thereafter, the track following function for that head takes place.

All of the patents aforesaid describe approaches to compensating for servo gain variations at the source, namely the magnetic head, and thus represent useful solutions to the problem of servo gain variation.

Further improvement however, is realized along with simplification in the implementation of servo gain variation compensation in the approach provided by the present invention.

DISCLOSURE OF THE INVENTION

This invention provides a new approach to the compensation of servo gain variations by utilizing the servo position signals, produced by the magnetic head in traversing or scanning the servo code of a disk drive, to develop servo gain scaling signals which are used to scale and correct the servo position signals. The corrected servo position signals function to eliminate servo gain variation in the drive. The corrected servo position signals thus comprise signals which are a function of the servo position signals combined with the servo position signals themselves. The corrected servo position signals are coupled to the servo system, instead of the servo code signals, to control servo gain.

In particular, practice of this invention comprises producing normal servo position signals, N, (sometimes called in-phase servo position signals) and quadrature phase servo position signals (Q) from four phases of servo code recorded on a disk in a disk drive. This servo code may be dedicated servo code or sampled servo code. The four phases of servo code, represented for example, by phases A, B, C and D, respectively, in which servo code phases A and B may define a normal or in-phase track and servo code phases C and D may define a quadrature track, may be repeated in identical servo code patterns in two or more consecutive circumferential frames, or in different servo code patterns in consecutive circumferential frames. One type of the latter is seen in U.S. Pat. No. 5,041,926 of Harold C. Ockerse et al, filed Nov. 13, 1989, entitled "Track Position Syncopation Cancellation in a Disk Drive", and assigned to the assignee of this invention (PD 189389). The subject matter of U.S. Pat. No. 5,041,926 is combined herein in its entirety by reference thereto.

The servo position signals are demodulated and are processed in selected differentially related pairs (A-B), (C-D), as one example, either by digital or analog means, to produce absolute values of the selected pairs of the signals. The absolute value, $|A-B|$, $|C-D|$, of these signals, whether produced by digital or analog means, is the equivalent of the full wave rectified value of the normal, N, or quadrature, Q, signals. Thus $N=(A-B)$ and $Q=(C-D)$ in the example chosen.

These absolute values, |N| and |Q|, herein called absolute N and absolute Q, are summed, |N|+|Q|, to produce a scaling signal for scaling the signal N or the signal Q. The corrected servo position signals, herein designated, N*, Q*, are produced by multiplying the normal, N, or the quadrature, Q, servo position signals by the reciprocal or inverse function, $$\frac{1}{|N|+|Q|},$$

of the scaling signal, |N|+|Q|. Digital and analog embodiments of this invention are disclosed. By converting the N and Q servo position signals to the corrected servo position signals N* and Q*, defined by $$\frac{N}{|N|+|Q|} \text{ or } \frac{Q}{|N|+|Q|},$$

changes in servo gain due to variations in electromagnetic coupling at the servo head, such as those caused by variations in width among the heads and variations in magnetic coupling among the heads with the magnetic dibits, are greatly reduced, and, additionally, changes in servo gain due to AGC (Automatic Gain Control) variations are eliminated.

DESCRIPTION OF THE PREFERRED EMBODIMENT

Servo gain variations are minimized and Automatic Gain Control (AGC) variations are eliminated in the servo system of a disk drive in which disk tracks are defined by four phases of servo code, either dedicated or sampled servo code, by developing normal, N, and quadrature, Q, servo position signals from the four phases of servo code, developing absolute values, |N| and |Q| of the servo position signals, N and Q , respectively, summing the absolute value signals, |N| and |Q|, to produce a scaling signal |N|+|Q|, and scaling the servo position signals, N and Q, with the scaling signal, |N|+|Q|, to produce a corrected servo position signal, N* or Q*, either of which, or the joint use of which, may be employed for controlling the servo system.

Figure 1:
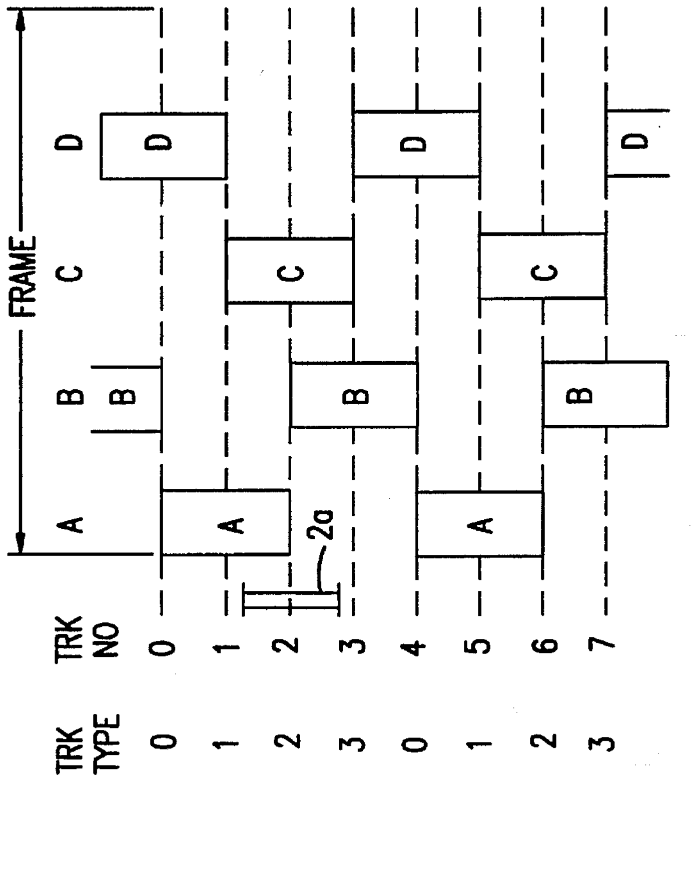
FIG. 1 is plot of magnetic dibits representing four phases of servo code defining tracks on a disk in a disk drive.
Figure 2:
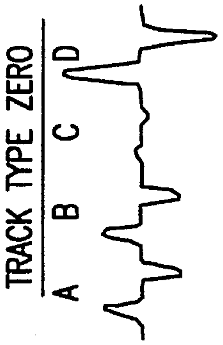
FIGS. 2–5 are representations of the signals induced in a magnetic head in scanning different tracks in the servo code of FIG. 1.
Figure 3:
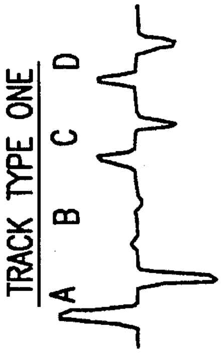
Figure 4:
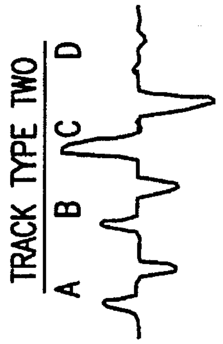
Figure 5:
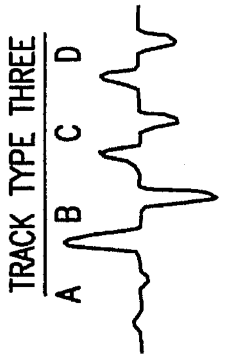

The invention is described employing a four phase servo code pattern or format, as seen in FIG. 1, representing a single circumferential frame of servo code and defining four track types which are repeated to span eight (8) tracks on a disk. Such a four phase servo code pattern may be employed as dedicated or sample servo code in implementing this invention. The four phases are identified as phases A, B, C and D. Other four phase pattern configurations may be used. U.S. Pat. No. 5,041,926 above, in which Harold C. Ockerse, the joint applicant in this application, is also a joint applicant, illustrates other pattern configurations of four phases of servo code. Still other patterns of four phases of servo code are available and are useful in developing normal, N, and quadrature, Q, signals in disk drives. As will be seen in the disclosure which follows, and as seen in U.S. Pat. No. 5,041,926 referenced above, various switching logic may be employed to differentially combine servo positions signals A, B, C and D, in selected pairs in one differential pair relationship or the reverse relationship, to produce the normal and quadrature signals, N and Q, respectively. The phase pairs (A-B) and (C-D) as used herein are illustrative.

Now, referring to FIG. 1, track types 0 and 2 are defined by servo code phase pairs A and B and track types 1 and 3 are defined by servo code phase pairs C and D. Track types 0 and 2 are arbitrarily designated the normal (or in phase) tracks, N, and track types 1 and 3 are arbitrarily designated the quadrature phase tracks, Q. Thus, the normal servo position signal, N, is represented by N=(A-B), as only one example, of all possible examples, and the quadrature servo position signal, Q, is similarly represented by Q=(C-D), all according to convention.

Figure 6:
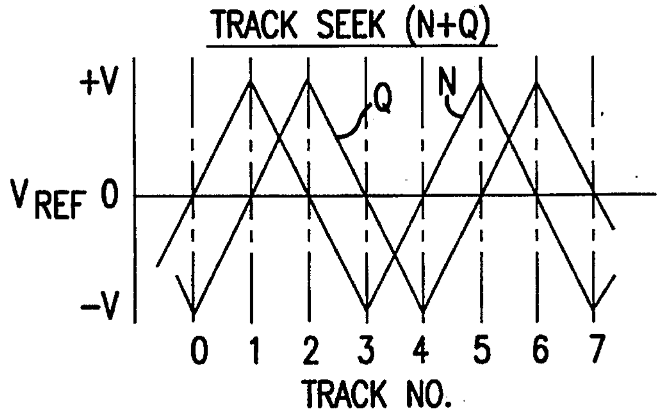
FIG. 6 depicts ideally configured normal, N, and quadrature, Q, signals induced in a magnetic head in crossing tracks defined by the servo code of FIG. 1.
Figure 7:
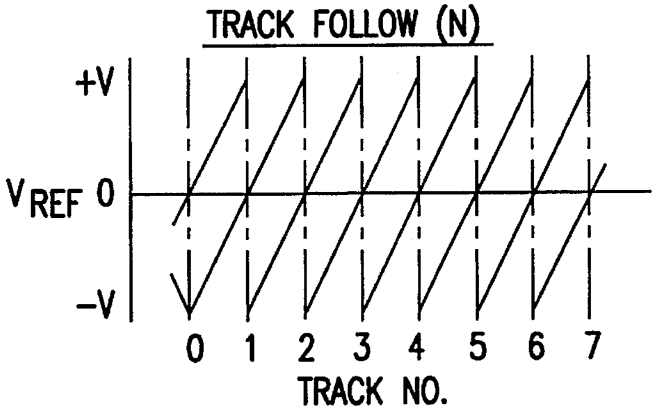
FIGS. 7 and 8 depict idealized normal, N, and quadrature, Q, signals developed in a magnetic head during track following on selected individual tracks.
Figure 8:
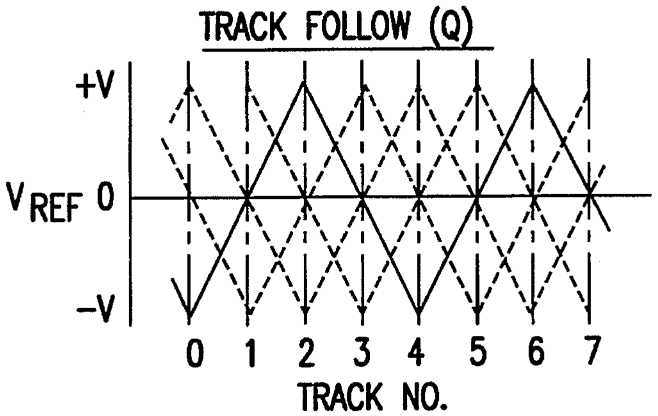

The derivation of these expressions is seen from FIGS. 2–5 picturing signals representing those induced in a magnetic head 2*a* while scanning the magnetic dibits defining the servo code while in a track centered position. FIGS. 6, 7 and 8 idealize the servo position signals N and Q in a track seek (track crossing) mode of operation, FIG. 6, and in a track following mode operation, FIGS. 7 and 8.

In the track following mode operation of FIG. 7, track following on the positive slope of the servo position signal N is indicated for all tracks. This is accomplished, according to convention, by switching the servo position signals, Q, into the servo system channel for the servo code signal N. Thus, according to one convention for track type 0, N=(A-B) and Q=(C-D), for track type 1, N=(C-D) and Q=(B-A), for track type 2, N=(B-A) and Q=(D-C), and for track type 3, N=(D-C) and Q=(A-B).

Whatever may be the combination of signals of the signal phases A, B, C or D, of the composite signal CS, at the input terminals of the differential amplifiers 14 and 15, that signal combination is processed in the existing differential pairs to form the scaling signal |N|+|Q|.

In the track following mode of FIG. 8, track following takes place on both the positive and negative slopes of the servo position signal Q on track types 1 and 3. Track following on both of the servo position signals N and Q results in servo code signals N and Q as seen in FIG. 7.

Thus, the practice of this invention requires only the production of the normal, N, and quadrature, Q, servo position signals and is in no way limited by the way in which the signals are produced or the purpose for which they are produced and may therefore be otherwise processed, such as the processing of U.S. Pat. No. 5,041,926 aforesaid. Thus, in reference to FIGS. 1 through 5, the selection of selected signal phase pairs from the signal phases A, B, C or D and their specific differential relationships in producing the normal phase servo position signal, N and the quadrature phase servo position signal, Q, is presented only in an illustrative sense in explaining the principles of this invention. In this connection it is noted that the development of servo position signals N and Q is known in the art. The development is reviewed here to characterize a few of the known alternatives which exist in addition to those of the referenced U.S. Pat. No. 5,041,926 to demonstrate equivalence among the several implementations and to further demonstrate that this invention is concerned with the processing of the servo position signals N and Q, not with their derivation.

Figure 9:
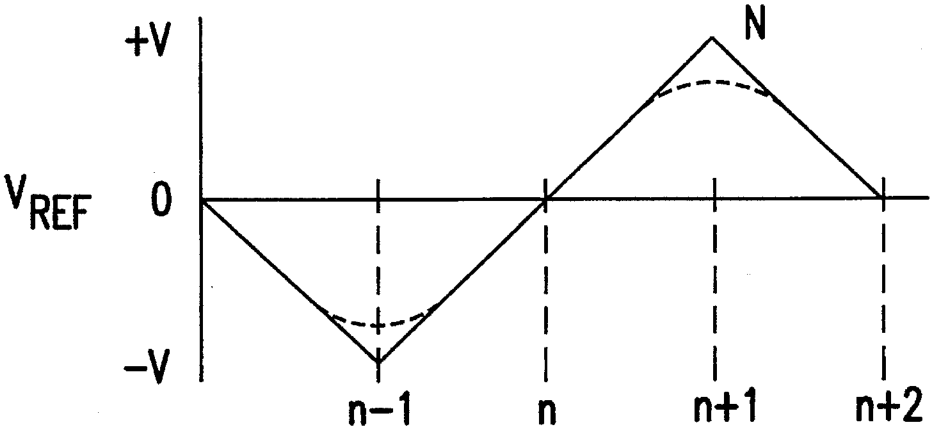
FIG. 9 is a signal diagram depicting examples of actual and ideal magnetic head signals developed in a magnetic head during track crossings.

FIG. 9 depicts ideal and actual servo code signals. An actual servo code signal is indicated by a dotted line in FIG. 9. The magnitude of actual signals as seen by the servo system, vary from head-to-head and from head-to-media, which degrades servo performance. Variations in signal magnitude from the ideal reduces the linear operating range of the servo, and variations in the actual signal magnitude vary the reduced linear operating range, both of which are undesirable in so far as servo system performance is concerned.

The disclosed method of servo position signal normalization or correction increases the linear operating range within the limits of servo gain and minimizes or eliminates servo gain variations caused by variations in head geometry and electromagnetic and electronic parameters, for example. Less gain variation also allows the servo system to maintain more stability margin which is in part a function of servo system gain.

Figure 10:
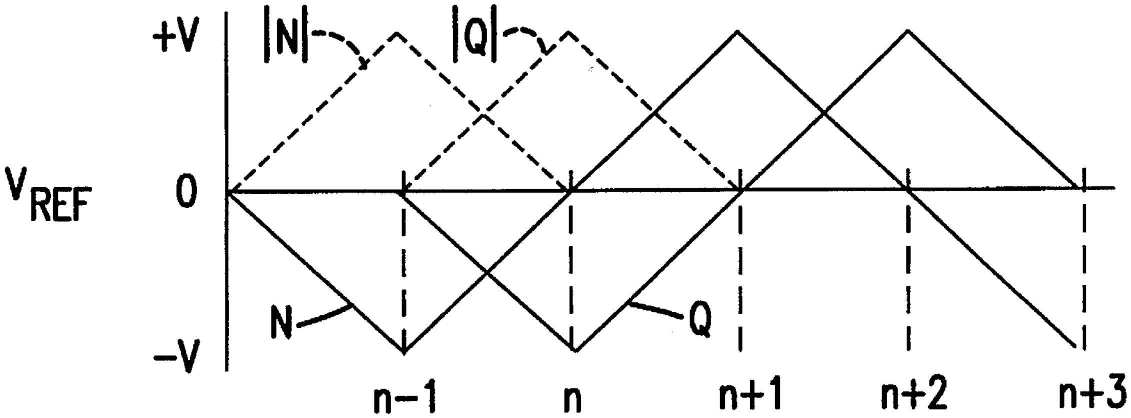
FIG. 10 is a signal diagram illustrating the development of absolute values, |N| and |Q| of the N and Q servo position signals.

FIG. 10 illustrates the development of the absolute value signals, |N| and |Q|, from the servo position signals, N and Q. By digital means, FIGS. 11 and 13, or by analog means, FIG. 14, an absolute value signal, |N| or |Q|, is produced which is the full wave rectified signal derived from the servo position signal, N or Q. The rectified, absolute value signals, |N| and |Q|, comprise the positive signal wave forms seen in dotted and solid outline, in FIG. 10. The absolute value signals, |N| and |Q|, are summed to produce a scaling signal |N|+|Q| which is combined with a servo position signal N or Q, to produce a corrected servo position signal N* or Q*. Specifically the corrected servo position signal, N* or Q*, is directly proportional to the servo position signal N or Q and an inverse function of the scaling signal |N|+|Q|, expressed as $$N^* = \frac{N}{|N| + |Q|} \text{ or } Q^* = \frac{Q}{|N| + |Q|}.$$

Figure 11:
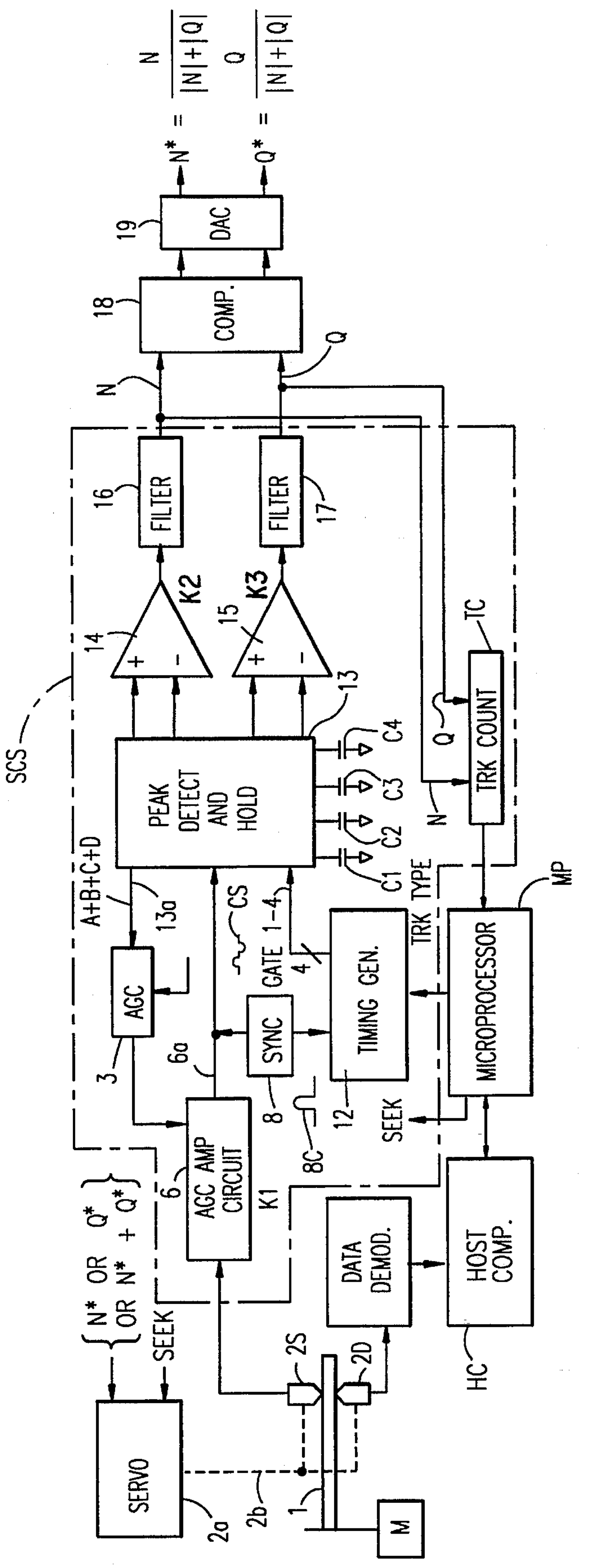
FIG. 11 is a block diagram of a digital implementation of this invention.

A digital implementation of a system for compensating servo gain variations is illustrated in FIG. 11. In this figure, a disk drive is schematically depicted as comprising a disk 1 which is driven at a constant rotational speed by a motor M. A servo magnetic head 2*s*, is supported by an arm stack 2*b*. The armstack 2*b* is driven by a motor, typically a voice coil type of motor, which is part of the servo 2*a* for moving the magnetic head, in track seeking modes of operation and also for controlling the magnetic head in a track following mode of operation.

The servo 2*a* comprises part of a servo system which includes a Servo Control System, SCS shown in dotted outline, which is under the control of a microprocessor MP. The microprocessor MP provides input to the servo control system, in response to requests from the host computer for information, to cause the servo 2*a* to move the magnetic head 2*s* to a servo code track corresponding to the data track which contains the requested information. The data is read by a data magnetic head 2*d*. After demodulation the data signals are supplied to the host computer HC.

Figure 12:
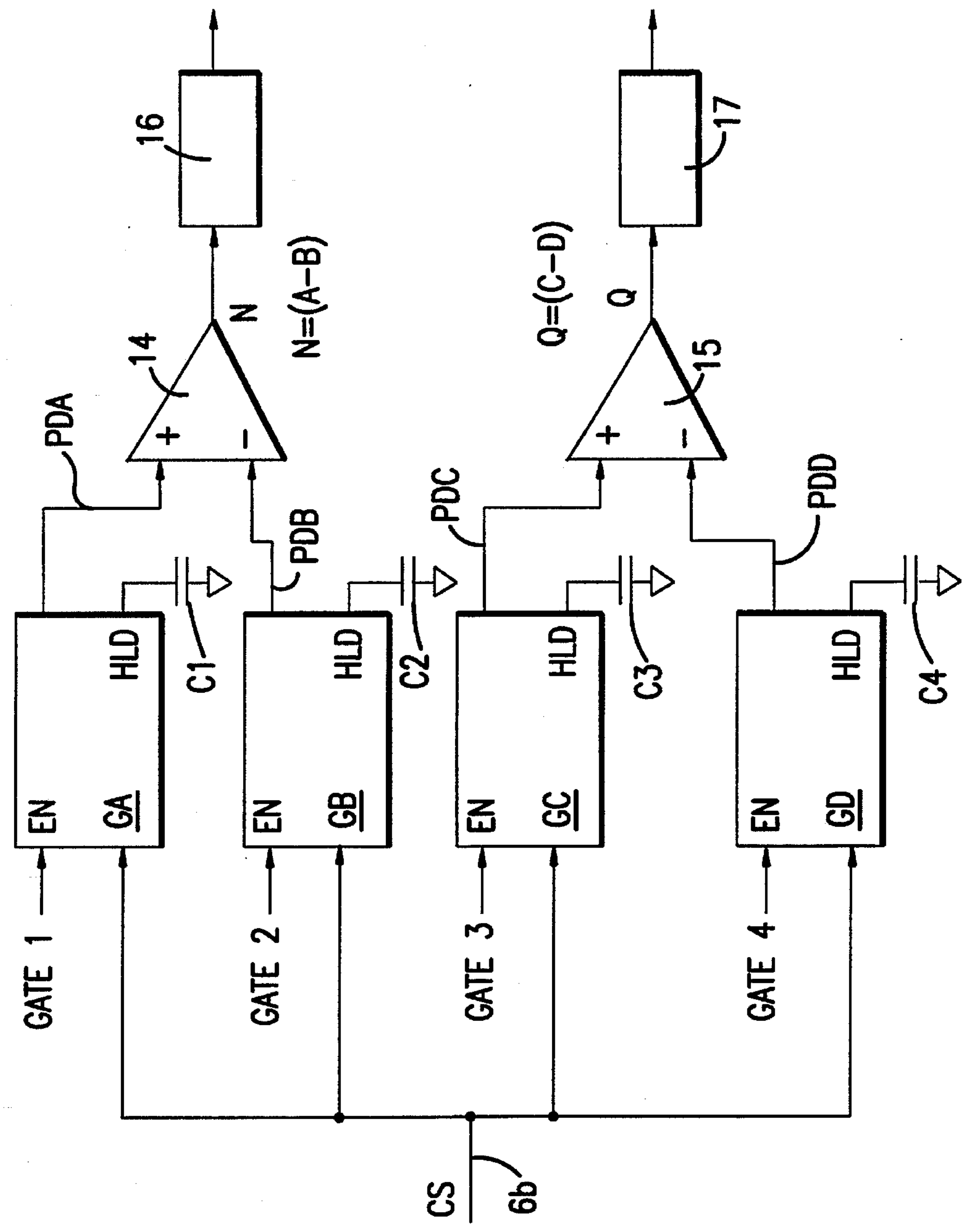
FIG. 12 is a detail of the peak detect and hold circuit of FIG. 11.

Information requests from the host computer HC are translated by the microprocessor to identify a particular track that contains the requested information. The microprocessor develops a track count from the present track at which the magnetic heads are positioned to the track which contains the requested information. This initiates the track seek mode of operation. Track crossing signals from the servo magnetic head 2*s* are coupled as input to an automatic gain control amplifier circuit 6, the output of which is coupled via output 6*a* to a peak detect and hold circuit 13. As seen in FIG. 12, the outputs PDA, PDB, PDC and PDD, of this peak detect and hold circuit 13, are coupled in differential pairs (PDA–PDB) and (PDC–PDD), for the example chosen therein, to differential amplifiers 14 and 15 at the outputs of which the servo position signals N and Q, respectively, are produced. These servo position signals N and Q, generated as track crossing signals during the seek mode of operation, are coupled back to the microprocessor MP via a track counter TC, where the actual track count is compared with the desired track count, to initiate track following by the servo 2*a* when the desired and the actual track counts are equal.

In view of the use of the four phases of servo code, the microprocessor, in addition to identifying the location of the particular track containing the requested information must also identify the type of track at which that information is located. For the example chosen, that track is track zero. This information is passed on to a timing generator 12 which is synchronized with the composite signal CS produced by the servo code magnetic head 2*s*, by a synchronizing signal 8*c*, for the purpose of producing gating signals, designated Gate 1–Gate 4, in a circuit from the timing generator 12 to the peak detect and hold circuit 13. By this means, the differing signal phases A, B, C and D of the composite signal CS are gated via the peak detect and hold circuit 13 to respective ones of the circuits PDA–PDD, whence, via the differentiating amplifiers 14 and 15, the signals N and Q are produced. Capacitors C1–C4, at the peak detect and hold circuit 13, store the peaks of the signals of signal phases A, B, C and D of the composite signal CS. These are the signals which are gated. Compensation is provided by an Automatic Gain Control circuit AGC to which a fixed voltage designated $V_{REF}$ is coupled to establish a desired AGC level for the AGC amplifier circuit 6. Some compensation for servo gain variations in this AGC loop, due to variations in the signal magnitudes from the servo code magnetic head 2*s*, is provided via output 13*a* which couples the summation of the peaks of the signal phases A, B, C and D from the peak detect and hold circuit 13 into the AGC circuit 3.

In prior art systems, the servo position signals N and Q are fed back to the servo 2*a* to control the servo in controlling the servo code magnetic head 25 in track seeking and track following operations. In practice either the N servo position signal or the Q servo position signal may be used to control the servo 2*a*. Still further, in practice both of the signals N and Q may be used in controlling the servo 2*a*. In the arrangement thus far described, compensation for servo gain variations is provided solely by the signal sum (A+B+C+D) as provided by the peak detect and hold circuit 13.

Assuming amplifier gain constants $k_1$, $k_2$, and $k_3$ for the amplifiers of the AGC amplifier circuit 6, the differential amplifier 14 and the differential amplifier 15, respectively, the equations for defining the servo position signals N and Q respectively may be defined as follows:

$$N=k_1 \cdot k_2\ (PDA-PDB)$$

$$Q=k_1 \cdot k_3\ (PDC-PDD)$$

In a processor or a computer 18 the following calculations must be performed:

$$N^* = \frac{N}{|N|+|Q|}$$

$$Q^* = \frac{Q}{|N|+|Q|}$$

let X represent N or Q then if $X \geqq V_{REF}$ then $|X|=X$ otherwise absolute $|X|=-1 \cdot X$ $$\text{thus } N^* = \frac{k_1 \cdot k_2\ (PDA-PDB)}{|k_1 \cdot k_2\ (PDA-PDB)| + |k_1 \cdot k_3\ (PDC-PDD)|} = 1 \cdot \frac{k_2\ (PDA-PDB)}{|k_2\ (PDA-PDB)| + |k_3\ (PDC-PDD)|}$$

and $$Q^* = \frac{k_1 \cdot k_2\ (PDC-PDD)}{|k_1 \cdot k_2\ (PDA-PDB)| + |k_1 \cdot k_3\ (PDC-PDD)|} = 1 \cdot \frac{k_3\ (PDC-PDD)}{|k_2\ (PDA-PDB)| + |k_3\ (PDC-PDD)|}$$

note: $k_1, k_2, k_3 > 0$

It is evident from the above equations that the AGC gain constant or gain factor, $k_1$, of the AGC amplifier circuit 6 cancels from the equations. By this expedient the AGC variation has been removed, along with other signal gain variations prior to the peak detectors.

This method is unique in that functions of the servo position signals N and Q are used directly to normalize the position signals themselves in the production of the corrected servo positon signals N* and Q*. These corrected servo position signals N* and Q* may be used to control the servo with or without some combination of the peak detected signals of signal phases A, B, C and D as gain control signals in the gain control feedback circuit 13*a*.

Figure 13:
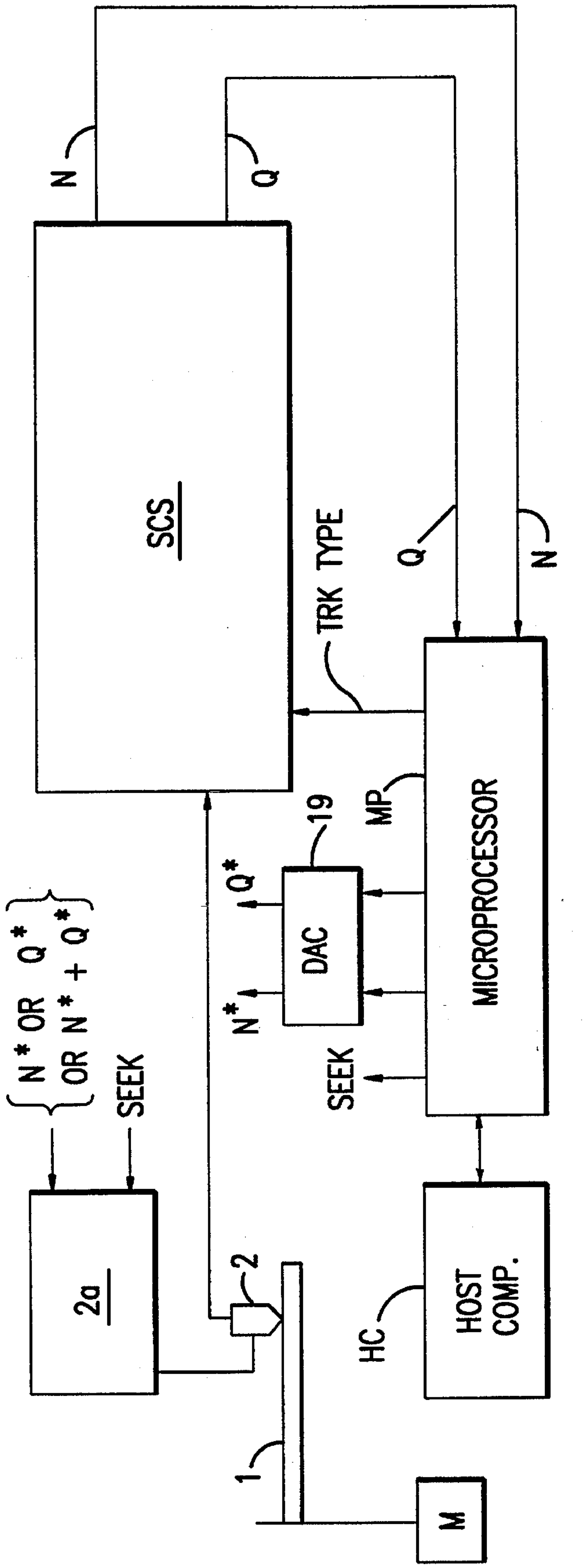
FIG. 13 is a modification of the invention of FIG. 12.

FIG. 13 illustrates a modification of the invention of FIG. 11. In FIG. 13 to simplify the illustration, the servo control system SCS of FIG. 12 is shown without detail as single block. In FIG. 11, digital processing is accomplished in a separate computer or processor designated 18. In situations where the microprocessor has sufficient capacity and timing is such to permit processing of the N and Q signals, a computer or processor 18 may not be required, in which case the N and Q signals from the servo control system SCS may be coupled directly into the microprocessor MP as indicated. The mathematical expressions, $$\frac{N}{|N|+|Q|} \text{ and } \frac{Q}{|N|+|Q|},$$

are now processed in the microprocessor MP. The digitally defined corrected servo position signals N* and Q* from the microprocessor are converted to analog signals N* and Q* by the digital to analog convertor DAC for application to the servo 2*a*, either individually or jointly, as indicated, at the input to the servo 2*a*, for the purpose of controlling the heads, either in the track seek or the track following modes of operation.

Figure 14:
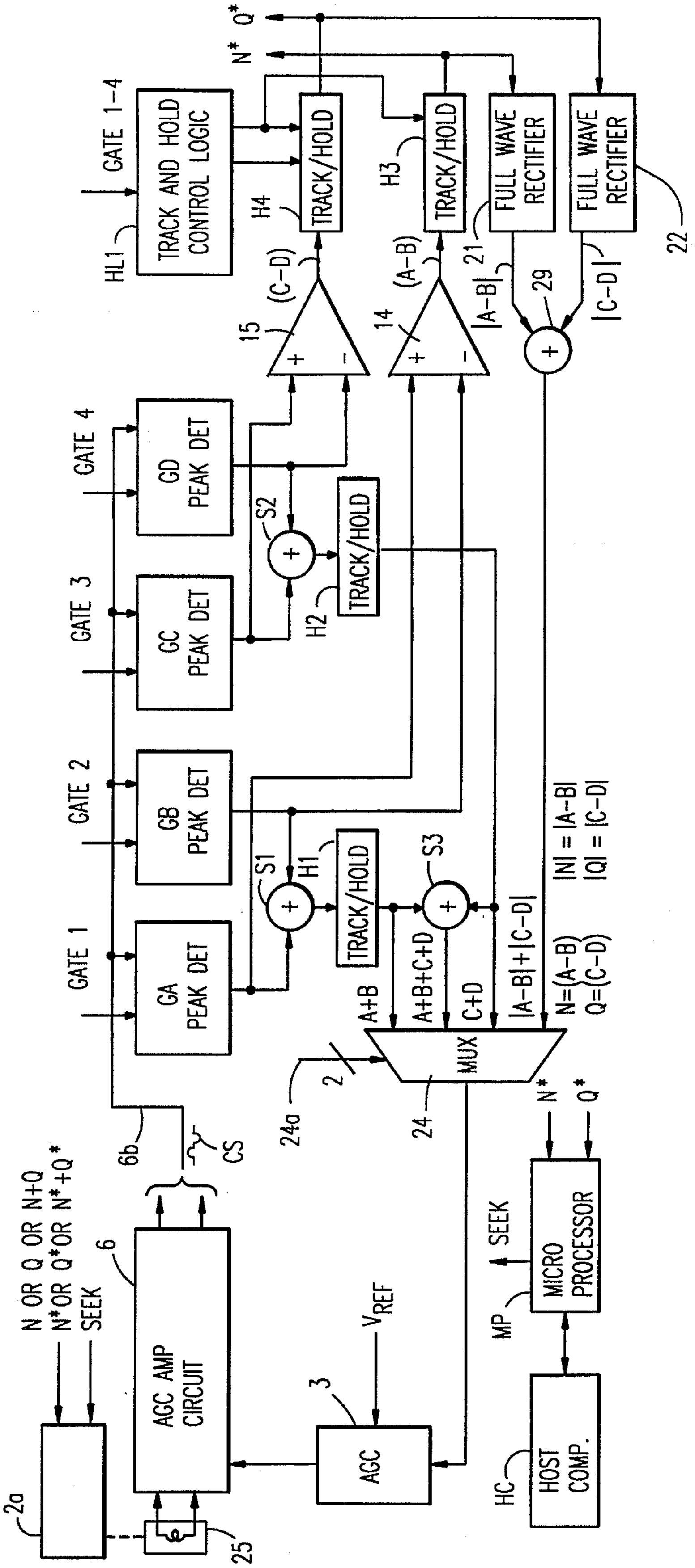
FIG. 14 is a block diagram of an analog implementation of this invention.

FIG. 14 illustrates another embodiment of this invention, presently regarded as the best mode for practicing this invention. The organizational concept of this embodiment of the invention is similar to that of FIG. 11, excepting that analog implementation of the expressions, $$\frac{N}{|N|+|Q|} \text{ and } \frac{Q}{|N|+|Q|},$$

is provided. Thus, the function of the servo in positioning the head 2*s* and in logically processing the signals of the signal phases A, B, C and D of the composite signal CS, to produce the normal and quadrature servo position signals N and Q, respectively, will be understood.

In this embodiment of the invention, the scaling signal |N|+|Q|, is formed by analog means. The servo position signals N and Q are coupled from the differential amplifier 14 and 15 into respective track and hold circuits H3 and H4 which are under the control of a track and hold control logic circuit HL1, in turn controlled by the gate signals, Gate 1 through Gate 4. The gate signals Gate 1 through Gate 4 provide timing and control for the track and hold circuits H3 and H4, respectively, to ensure synchronism of signal development throughout the system, particularly with respect to the development of the absolute signals, |N| and |Q|, and the corrected servo code signals N* and Q*.

The output of the track and hold circuits H3 and H4 are coupled respectively as inputs to full wave rectifiers 21 and 22, which may be any type of full wave rectifier compatible with the circuit implementation of the servo control system. The outputs of the full wave rectifiers 21 and 22 are coupled to a summing junction 23, the output of which is coupled as an AGC feedback signal into an automatic gain control circuit 3, of the type describe in FIG. 11, having a fixed gain control reference voltage $V_{REF}$ coupled thereto. The output of this AGC signal circuit 3 is coupled to the AGC amplifier circuit 6 to control the gain thereof. This closes the automatic gain control loop.

Although the implementation of the circuit as described thus far in its analog configuration differs from that of the digital configuration illustrated in FIG. 11, it will be noted that in each case,the end result is the development of the servo position correction signals N* and Q*. Recalling that in FIG. 11, the computer 18 performed signal processes defined by the expressions, $$\frac{N}{|N|+|Q|} \text{ and } \frac{Q}{|N|+|Q|},$$

in producing the servo position correction signals N* and Q*, it will be observed that in these expressions, should the denominators decrease, in an interval when the servo position signals N and Q momentarily are unchanged, the corrected servo position signals N* and Q* increase. Considering now the performance of the analog circuit FIG. 14, should the AGC feedback signal from the multiplexer 24 decrease as a result of the decrease in the scaling signal |N|+|Q|, this decrease, which is differential related to the fixed bias $V_{REF}$, will result in an increase in the output of the automatic gain control signal from the AGC circuit 3, the result being an increase in the output of the AGC amplifier and a corresponding increase in a signal N* or Q*. Processing of the scaling signal |N|+|Q|, in the circuit illustrated, relates the N and Q signals to the scaling signal |N|+|Q| as defined by the expressions, $$\frac{N}{|N|+|Q|} \text{ or } \frac{Q}{|N|+|Q|},$$

to the end that the signal outputs at the respective track and hold circuits H3 and H4 are the corrected servo position signals N* and Q* respectively.

The multiplexing circuit 24 is not to be regarded as an essential aspect of practicing this best mode of the invention. The scaling signal |N|+|Q| does not require the multiplexer for coupling to the automatic gain control signal circuit 3. Multiplexing circuit 24 is provided solely for the purpose of selecting other AGC feedback signals for coupling to the automatic gain signal circuit 3 to afford flexibility in the disk drive control system, one of the reasons being to compare other feedback schemes with the improved feedback arrangement of this invention. To this latter end the multiplexing circuit 24 is controlled by an AGC selection circuit for switching the respective inputs selectively to the output circuit.

One input circuit to the multiplexer comprises the outputs of the gates GA, GB which are summed at a summing junction S1. The summing junction S1, is connected to a track and hold circuit H1, the output of which, represented as the signal phase sum (A+B) of the composite signal CS, is coupled into the multiplexer. The output of the track and hold circuit H1 is also coupled as input to a summing junction S3. The other input to which is the signal phase sum (C+D) of the composite signal CS. The signal phase sum (C+D) is derived from the gates GC and GD via a summing junction S2 and a track and hold circuit H2. The output of the track and hold circuit represented in the signal phase sum (C+D) of the composite signal CS is coupled directly into the multiplexer and the output of summing junction S3 represented in the signal phase sum (A+B+C+D) of the composite signal CS is also coupled into the multiplexer. Thus, these three described signal sets plus the scaling signal, of which one example is, |N|+|Q| or |A-B|+|C-D|, are coupled as input into the multiplexer to be selectively coupled therefrom as the AGC feedback signal into the AGC signal circuit 3.

The track and hold circuits H1, H2, H3, and H4 (four hold circuits) control or hold the signals of the signal phases A, B, C, D of the composite signal CS coupled thereto. As seen in FIGS. 2–5 these signals of the signal phases A, B, C and D do not occur or exist simultaneously. Thus, the hold circuits assure that the signals from the adjacent phases of the composite signal CS that are coupled into the respective track and hold circuits exist together for an interval of time to permit their summing. Summing at the multiplexer input is an alternative. Since these signals at the multiplexer are not gated directly into the servo loop, precise timing is not critical.

The track and hold circuits H3 and H4 require precise control since they are in the servo signal loop. The N and Q or N* and Q* servo code signals or the corrected servo code signals, respectively which propagate through the circuits H3 and H4, are servo control signals, the N* and Q* signals being compensated for servo gain. Precise signal timing is needed here. The track and hold control logic circuit HL1 provides signal timing control for these track and hold circuits H3 and H4 under the control of the gate signals, Gate 1–Gate 4. Thus, the timing of either of the servo code signal pairs which control the servo 2*a* is tied to the signal timing in the servo control system SCS for controlling the movement and positioning of the magnetic heads.

The rolls of the host computer HC and the microprocessor MP in this system are similar to that described in connection with FIG. 11 and will be understood therefrom. Although the servo gain correction signals N* and Q* are shown connected to the microprocessor in FIG. 14, the purpose of these signals in the microprocessor does not necessarily require that these signals be corrected for servo gain. Since the input they convey to the microprocessor is primarily that of an indication of individual track crossings during track seek or track offset during track following.

Figure 15:
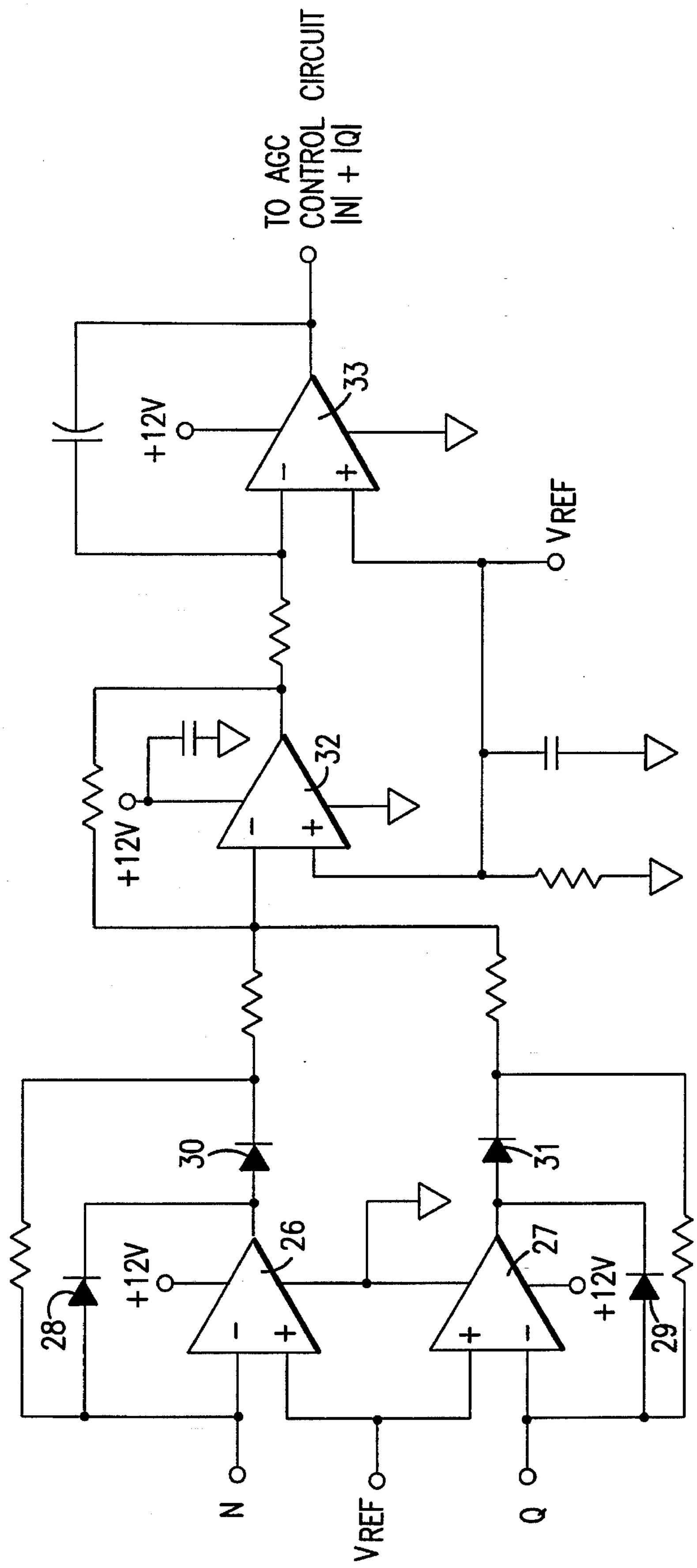
FIG. 15 diagrammatically illustrates a full wave rectifier circuit of a type employable in the analog circuit of FIG. 14.

A full-wave rectifier circuit, compatible with circuit implementation of the type of FIG. 14, for affording full-wave rectification of the servo position signals N and Q or N* and Q*, is illustrated in FIG. 15. In FIG. 15, differential amplifiers 26 and 27 have a fixed reference voltage, $V_{REF}$, a positive voltage, coupled to their respective positive input terminals. In the servo gain correction mode, the corrected servo position signals N* and Q* are coupled to the respective negative input terminals of these differential amplifiers. Half-wave rectifiers 28 and 29, respectively, provide unidirectional coupling from the negative input terminals to the output terminals of these amplifiers. The polarized output circuits 30 and 31, of the differential amplifiers 26 and 27, are commonly coupled to the negative input terminal of an amplifier 32 which functions as an invertor amplifier to compensate the signal inversion of the integrator output amplifier 33. The positive input terminals of the invertor amplifier 32 and the integrator amplifier 33 are also connected to the fixed positive voltage designated $V_{REF}$. The output of the integrator amplifier 33 is the scaling signal, one form of which is |A-B|+|C-D|, as seen in FIG. 14, but the form of which depends upon the time of enabling of the respective gates, GA–GD, in the presence of a signal A, B, C or D.

In operation, in track crossing and track following modes, as seen in FIGS. 6, 7 and 8, the N and Q signals vary linearly between positive and negative values depending upon the position of the magnetic head with respect to track center. At track center the signals are at a $V_{REF}$ value. The N and Q or N* and Q* signals are differentially processed by the amplifiers 26 and 27, respectively, and coupled into the directionally polarized output circuits 30 and 31, respectively. The half-wave rectifiers 28 and 29 function as polarizers to isolate the output circuits of the differential amplifiers 26 and 27, from the input circuits N and Q when these circuits carry the negative values of the off track voltages N and Q.

Figure 16:
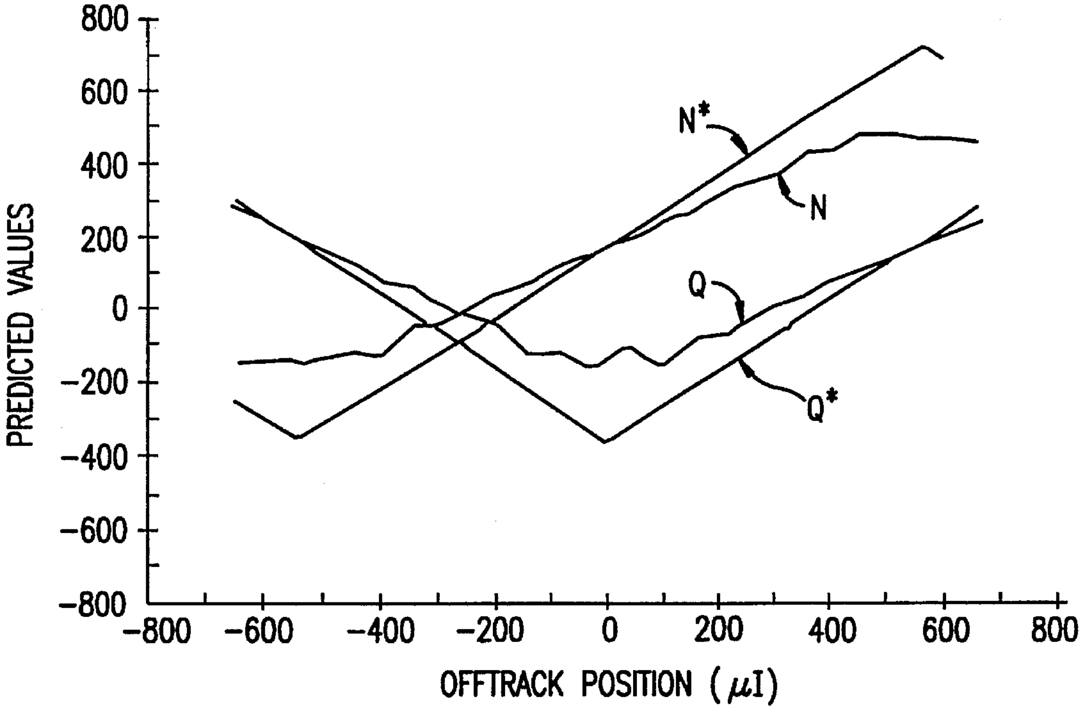
FIGS. 16 and 17 are computer simulations comparing uncorrected and corrected N and N* signals, respectively, and uncorrected and corrected Q and Q* signals, respectively, for a wide head, FIG. 16, and for a narrow head, FIG. 17. Here a gain nonlinearity of 10% is assumed in both FIG. 16 and FIG. 17. An AGC value of +20% is assumed in FIG. 16 and −20% in FIG. 17.

The servo gain correction function of the systems disclosed herein, in compensating servo gain variations, is seen in FIGS. 16–19, which are traces of servo signals from computer simulations based upon the parameters of a specific disk drive. These signal diagrams are presented in pairs in which gain nonlinearity is the same. In FIG. 16 and AGC error of +20% is assumed and in FIG. 17 and AGC error of −20% is assumed. In the widths of the magnetic heads for which the signals are plotted are different. All of the figures plot servo position signal pairs N and Q and the corrected servo position signal pairs N* and Q*, as plots of predicted values against off track positions in microinches.

FIG. 16 is a signal plot for a wide head assumed at 120% of the nominal head read-width. Gain nonlinearity is assumed at 10% and the AGC value at +20%.

Figure 17:
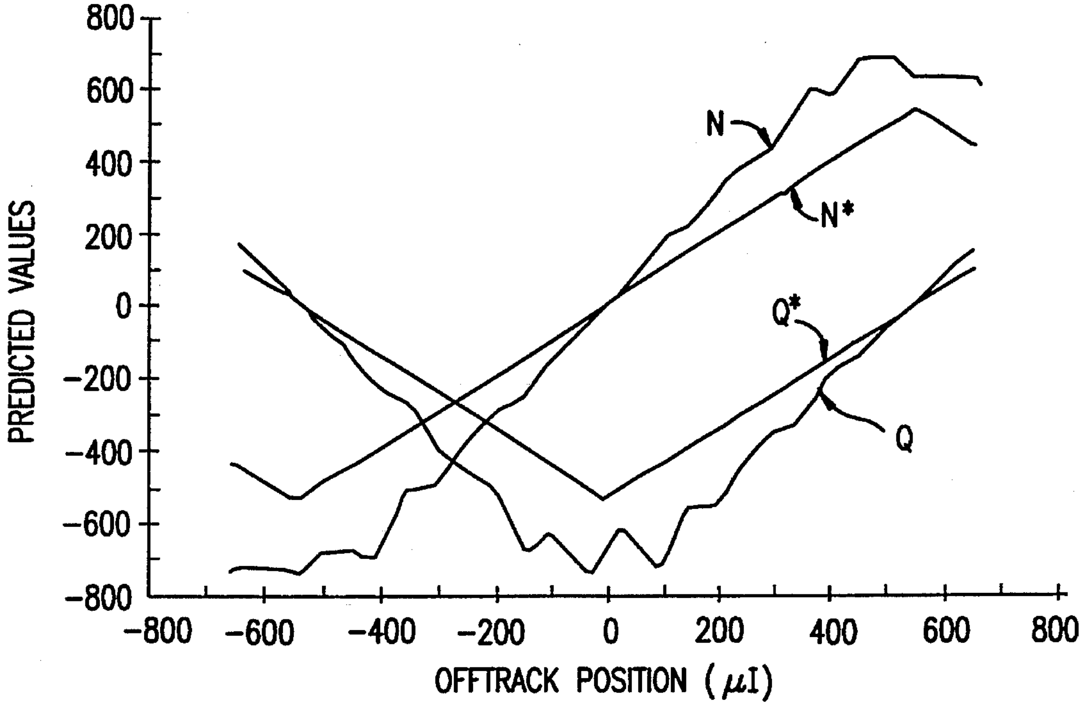

FIG. 17 assumes the same gain nonlinearity and a −20% AGC value for a head which is 80% of the nominal read-width. The signal gain variations between the wide head and the narrow head is represented in the wavy lines in these respective figures, depicting the uncorrected N and Q servo position signals, vary markedly from one another and contribute significantly to unsatisfactory servo performance.

On the other hand, the corrected servo code signals, N* and Q*, approach ideal linearity configurations between their peaks. Note also the fact that the values of the peaks of the servo code correction signals N* and Q* are substantially identical in their minimum and maximum values and may be precisely scaled in magnitude to the limits of servo gain. Still further, unlike the uncorrected servo position signals N and Q the corrected servo position signals N* and Q* in the respective figures have similar peaks thus it is evident that the system, as simulated on the computer for the assumed parameters, with the indicated gain nonlinearity and AGC values, compensates servo gain variations resulting from the coupling of magnetic heads of differing widths to the servo.

Figure 18:
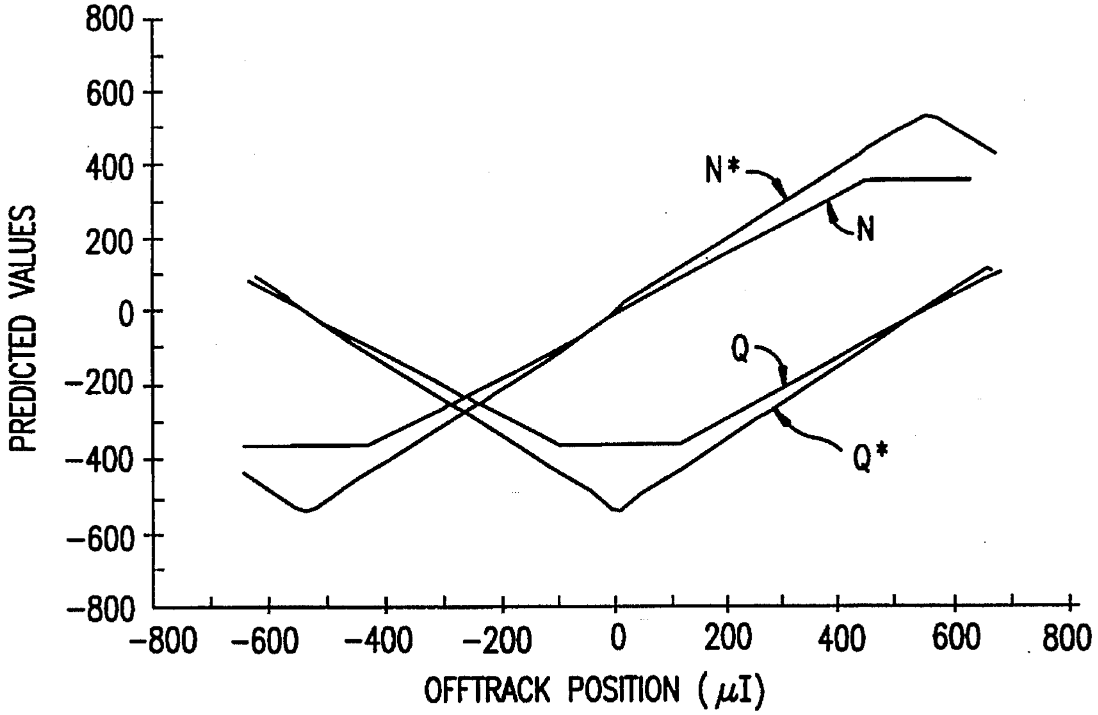
FIGS. 18 and 19 are computer simulations comparing the uncorrected and corrected N and N* signals and the uncorrected and corrected Q and Q* signals, for the wide head in FIG. 18 and the narrow head in FIG. 19. In these figures gain linearity is assumed and a correct AGC value is assumed.
Figure 19:
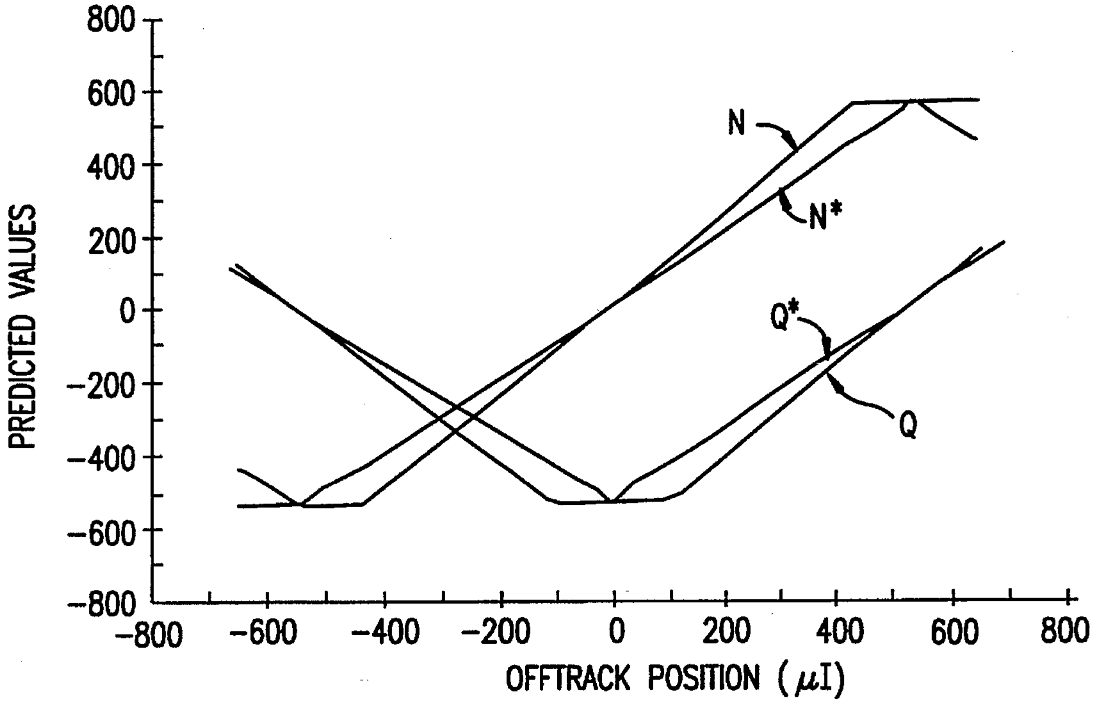

FIGS. 18 and 19, using the same parameters for the widths of the magnetic heads and for the same specific disk drive as in FIGS. 16 and 17, plot the servo position signals N, Q and N*, Q*, in this instance for the assumed conditions of gain linearity and correct AGC values. In these plots, the uncorrected signals N and Q display linearity between their peaks. However, here again the magnitudes of the uncorrected signals differ markedly between the wide and the narrow heads. Thus the variation in signal gain, which is the contributing factor in the variation in servo gain, exists here also. Note, however, that the corrected servo code signals N* and Q*, in both figures, exhibit the same level of signal gain. Consequently, for the heads of differing widths the servo "sees" the same signal gain and the servo gain for these heads of differing widths is therefore the same.

Figure 20:
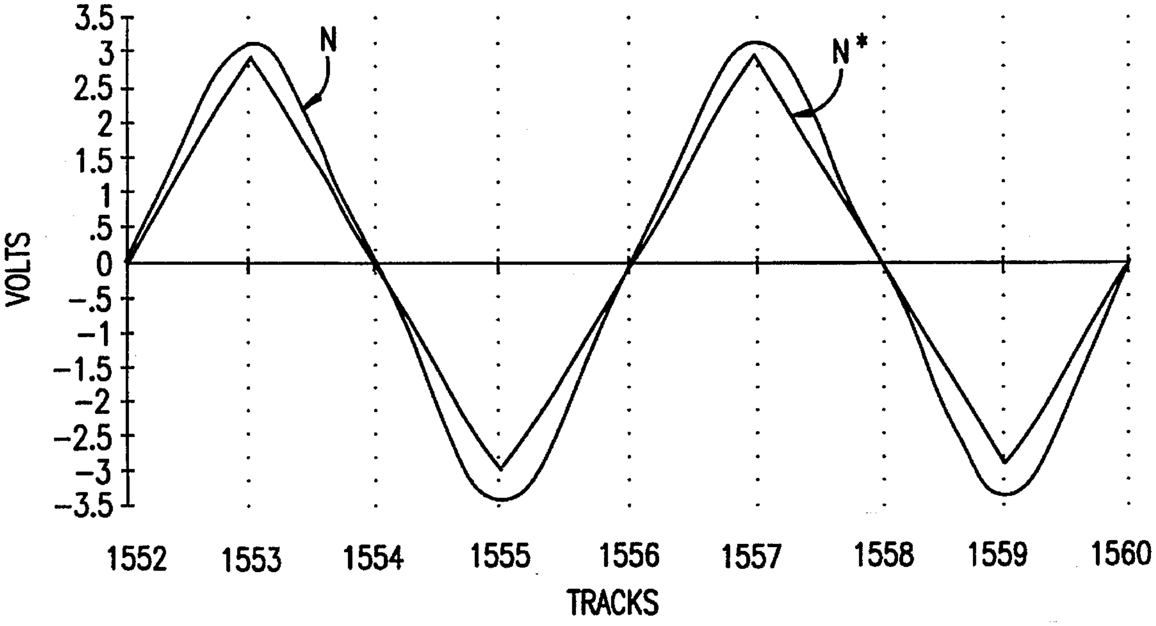
FIG. 20 depicts servo code signals N and corrected servo code signals N* traced from test signals derived from a production disk drive embodying that embodiment of this invention which is illustrated in FIG. 14.

FIG. 20 displays traces of corrected and uncorrected servo code signals derived from tests of a system such as that demonstrated in the system of FIG. 14 which is the analog implementation of this invention. The system, as tested without the improved servo gain variation compensation of this invention, embodies servo gain compensation in the production of an AGC feedback signal based upon the summation of the signal phases A, B, C and D of the composite signal CS as seen at the multiplexer 24 in FIG. 14. The signal plot for this conventional approach of servo gain compensation is denoted N. This uncorrected servo position signal N, exceeds desired servo gain limits in both its positive and negative extremes, and, in these extremes, the signals are of different magnitude which is undesirable. Still further, because of the broad rounded ends of the peaks of these signals the range of usable linearity within these extended extremes is less than that of the corrected signal, N*. The corrected signal, N*, it will be observed, has sharp peaks which terminate precisely in their positive and negative extremes at +3 volts and −3 volts and are usefully linear throughout the range between these extremes. This corrected signal, N* is almost precisely that of the idealized signals, such as illustrated in FIGS. 6 and 10.

Figure 21:
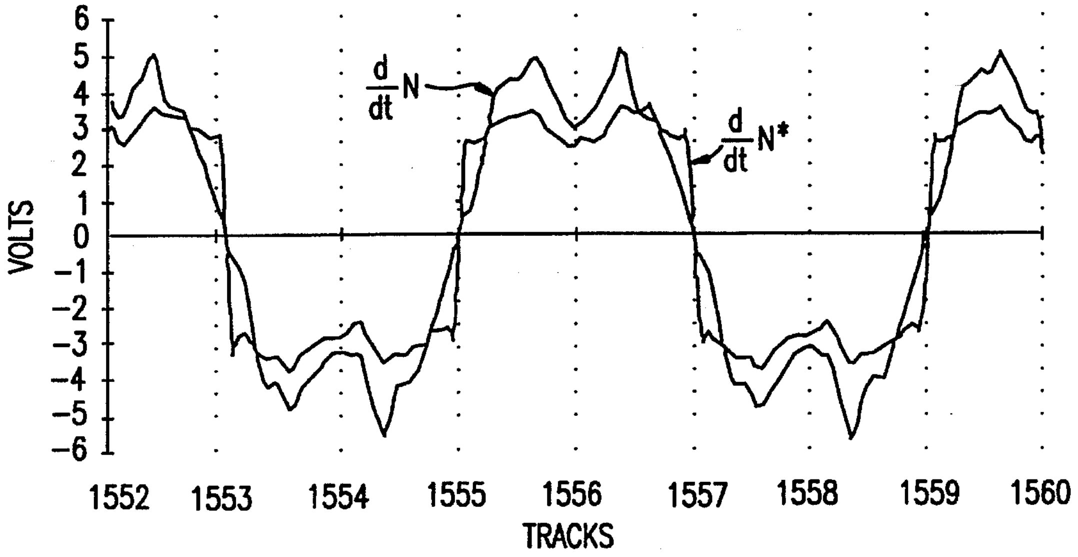
FIG. 21 depicts signals indicating the time rate of change of the head/track position signals of FIG. 20, highlighting the improvement achieved in minimizing signal gain variations.

Evidence of the improvement provided in servo gain variation compensation by this approach is seen in FIG. 21 which plots the derivative of the position signals of FIG. 20. The range of linearity for both the uncorrected and the corrected signals in the derivative signal display of FIG. 21, is evident in the difference in the slopes of the derivative signals between their voltage extremes, indicating that linearity exists between the peak in the corrected servo position signal N*.

The slight nonlinearity observable in both of the signal traces of FIG. 20, extending across the $V_{REF}$ or 0 voltage level, being small, is in the "noise" level and does not require correction in state of the art applications. In the event, however, of a need for correcting such nonlinearity provision for a feedback signal for that purpose is easily made. Recalling that the illustrative feedback term of this invention, of the several possible feedback terms, is |A-B|+|C-D|, a new feedback term which corrects the noted nonlinearity, expressed in the same signal terms, is $$\text{Maximum}\left[(|A-B|+|C-D|),\ \text{or},\ \left(\frac{|A+B|+|C-D|}{2}\right)\right]$$

These are individual scaling signals. The first is seen as that indicated in FIG. 14. The expression indicates that the larger of these two scaling signals is to be used as the scaling signal to be coupled via the multiplexer 24 to the AGC signal circuit 3, in place of |A-B|+|C-D|.

Thus, by utilizing the servo code signals, N and Q, to develop a scaling signal therefrom, which is combined with the individual servo code signals N or Q to produce a corrected servo position signal, significant improvements in servo performance are achieved. The unique signal development, processing and utilization in the method described herein for servo gain control, is conveniently implemented in either digital or analog circuits, as shown in FIGS. 11, 13 and 14. These and other implementations of the unique method described herein are contemplated within the scope of practicing the method herein.

I claim:

1. In a disk drive having a transducer for producing servo position signals from four phases of recorded servo code and having means including a servo system responsive to said servo position signals for powering said transducer in track seeking or track following modes of operation, a method employing said servo position signals for controlling servo gain, comprising the steps of:

a. developing a normal servo position signal and a quadrature servo position signal from said four phases of recorded servo code;

b. producing a servo gain scaling signal from said normal servo position signal and said quadrature servo position signal;

c. combining said servo gain scaling signal with at least one of said normal position signal and said quadrature servo position signal for producing a corrected servo position signal which is corrected for servo gain, and d. controlling said servo system with said corrected servo position signal.

2. The method for controlling servo gain according to claim 1 in which said step of:

a. said step of producing a servo gain scaling signal comprises producing a signal which is an inverse function of the sum of functions of said normal servo position signal and said quadrature servo position signal.

3. The method for controlling servo gain according to claim 1, in which:

a. said step of producing a servo gain scaling signal comprises producing a scaling signal which is the sum of functions of said normal and quadrature servo position signals, and b. inverting said scaling signal to produce said servo gain scaling signal, and c. said step of combining said servo gain scaling signal comprises multiplying said servo gain scaling signal with said at least one of said normal servo position signal and said quadrature servo position signal.

4. The method of controlling servo gain according to claim 3 in which:

a. said step of producing a scaling signal comprises producing absolute value signals of each of said normal servo position signal and said quadrature servo position signal, and b. summing said absolute value signals to produce said scaling signal.

5. The method for controlling servo gain according to claim 3 in which:

a. said step of producing a scaling signal comprises developing a first differential pair of signals from a first pair of signals derived from a first phase pair of said four phases of recorded servo code;

b. developing a second differential pair of signals from a second pair of signals derived from a second phase pair of said four phases of recorded servo codes;

c. full-wave rectifying said first differential pair of signals and said second differential pair of signals, and d. summing the full-wave rectified differential pairs of signals.

6. Means for minimizing servo gain variations in a servo disk drive, having four phases of servo code recorded on a surface of a disk thereof comprising:

a. transducer means responsive to said four phases of servo code for producing a normal servo position signal and a quadrature servo position signal;

b. means responsive to said normal servo position signal and to said quadrature servo position signal for producing a scaling signal;

c. means for producing a servo gain scaling signal which is the inverse of said scaling signal;

d. means for combining said servo gain scaling signal and said at least one of said normal servo position signal and said quadrature servo position signal for producing a corrected servo position signal, and e. servo means responsive to said corrected servo position signal for controlling said transducer means.

7. The invention according to claim 6, in which said means for producing a scaling signal, comprises;

a. means responsive to said normal servo position signal and to said quadrature servo position signal for producing an absolute value signal of each said normal servo position signal and said quadrature servo position signal, and b. means for summing the absolute value signals.

8. The invention according to claim 7, in which said means for producing the absolute value signals comprises:

a. full wave rectifier means for each said normal servo position signal and said quadrature servo position signal.

9. The invention according to claim 6, in which.

a. said means for combining produces a corrected servo position signal which is proportional to the product of said at least one of said normal servo position signal and said quadrature servo position signal, and said servo gain scaling signal.

10. The invention according to claim 9, in which:

a. said means for combining comprises a digital computer responsive to said normal servo position signal, N, and said quadrature servo code signal, Q, for producing an electrical output of the form $$\frac{X}{|N| + |Q|}$$

where X=N or Q and |N| and |Q| are absolute values of N and Q.

11. The invention according to claim 6, in which:

a. said means for combining comprises an automatic gain control means responsive to said normal servo position signal and to said quadrature servo position signal, for controlling said servo, and b. means for coupling said scaling signal to said automatic gain control means for controlling the gain thereof.

12. The invention according to claim 11, in which said automatic gain control means comprises:

a. a gain control circuit for controlling the gain of said automatic gain control means;

b. means for coupling a gain control reference voltage to said gain control circuit to establish a servo gain reference level, and c. means for differentially coupling said scaling signal to said gain control circuit with respect to said gain control reference voltage.

13. Means for minimizing servo gain variation in a servo in a disk drive, comprising:

a servo b. a rotatable disk;

c. four phases of servo code recorded on a surface of said disk;

d. means controlled by said servo for producing phase signals from each phase of said four phases of servo code;

e. means for differentially combining a first pair of phase signals to produce a normal servo position signal;

f. means for differentially combining a different second pair of phase signals to produce a quadrature servo position signal;

g. means for rectifying said normal servo position signal and said quadrature servo position signal;

h. means for summing the rectified normal servo position signal and the rectified quadrature servo position signal to produce a scaling signal;

i. means for producing a servo gain scaling signal which is inversely proportional to said scaling signal;

j. means for correcting at least one of said normal servo position signal and said quadrature servo position signal with said servo gain scaling signal to produce a corrected servo position signal of said at least one signal, and k. means for applying said corrected servo position signal to said servo to control said servo.

14. A method for producing a servo gain corrected, servo position signal from four phases of servo code on a media in a disk drive, comprising:

a. producing a normal servo position signal and a quadrature servo position signal from said four phases of servo code;

b. producing a servo gain scaling signal from said normal servo position signal and said quadrature servo position signal, and c. combining said servo gain scaling signal with at least one of said normal servo position signal and said quadrature servo position signal for producing a servo gain corrected, servo position signal.

15. The method for producing a servo gain corrected, servo position signal according to claim 14, in which:

a. producing a servo gain scaling signal comprises:

1. producing an absolute value of said normal servo position signal;
2. producing an absolute value of said quadrature servo position signal;
3. summing said absolute value of said normal servo position signal and said absolute value of said quadrature servo position signal to produce a scaling signal, and
4. producing a signal proportional to the inverse of said scaling signal which is said servo gain scaling signal.

16. The method for producing a servo gain corrected, servo position signal according to claim 14, in which:

a. producing a servo gain scaling signal comprises:

1. producing an absolute value of said normal servo position signal;
2. producing an absolute value of said quadrature servo position signal;
3. summing said absolute value of said normal servo position signal and said absolute value of said quadrature servo position signal to produce a scaling signal;
4. producing a signal proportional to the inverse of said scaling signal which is said servo gain scaling signal, and in which:

b. producing a servo gain corrected, servo position signal comprises:

1. multiplying together said signal proportional to the inverse of said scaling signal and one of said normal servo position signal and said quadrature servo position signal to produce said servo gain corrected, servo position signal.

* * * * *